(No Model.) 7 Sheets—Sheet 1.

F. W. TAYLOR.
CHUCK.

No. 368,693. Patented Aug. 23, 1887.

WITNESSES:
R. H. Whittlesey
F. E. Gauther

INVENTOR
Fred. W. Taylor
BY
J. Snowden Bell,
ATTORNEY

N. PETERS, Photo-Lithographer, Washington, D. C.

(No Model.) 7 Sheets—Sheet 2.

F. W. TAYLOR.
CHUCK.

No. 368,693. Patented Aug. 23, 1887.

WITNESSES:
R. H. Whittlesey
F. E. Gaither

INVENTOR
Fred. W. Taylor
BY
J. Snowden Bell,
ATTORNEY

(No Model.)

F. W. TAYLOR.
CHUCK.

No. 368,693.    Patented Aug. 23, 1887.

WITNESSES:
R. H. Whittesey
F. E. Gaither

INVENTOR
Fred. W. Taylor
BY
J. Snowden Bell,
ATTORNEY (No Model.)
7 Sheets—Sheet 4.

F. W. TAYLOR.
CHUCK.

No. 368,693.
Patented Aug. 23, 1887.

WITNESSES:
R. H. Whimsey
F. E. Gaither

INVENTOR
Fred. W. Taylor
BY
J. Snowden Bell
ATTORNEY (No Model.)  7 Sheets—Sheet 5.

F. W. TAYLOR.
CHUCK.

No. 368,693.  Patented Aug. 23, 1887.

WITNESSES:  INVENTOR
R. H. Whittlesey  Fred. W. Taylor
F. E. Gaither  BY
  J. Snowden Bell
  ATTORNEY (No Model.)   7 Sheets—Sheet 6.

F. W. TAYLOR.
CHUCK.

No. 368,693.   Patented Aug. 23, 1887.

WITNESSES:
R. H. Whittlesey
F. E. Gaither

INVENTOR
Fred. W. Taylor
BY
J. Snowden Bell
ATTORNEY (No Model.)  F. W. TAYLOR.  7 Sheets—Sheet 7.
CHUCK.

No. 368,693.  Patented Aug. 23, 1887.

WITNESSES:
R. H. Whittlesey
F. E. Gaither

INVENTOR
Fred. W. Taylor
BY
J. Snowden Bell,
ATTORNEY

UNITED STATES PATENT OFFICE.

FREDERICK W. TAYLOR, OF PHILADELPHIA, PENNSYLVANIA.

CHUCK.

SPECIFICATION forming part of Letters Patent No. 368,693, dated August 23, 1887.

Application filed February 14, 1887. Serial No. 227,636. (No model.)

*To all whom it may concern:*

Be it known that I, FREDERICK W. TAYLOR, of the city and county of Philadelphia, in the State of Pennsylvania, have invented certain new and useful Improvements in Chucks or Carriers, of which improvements the following is a specification.

My invention relates to devices generically known as "chucks" or "carriers" for holding or driving pieces of metal, wood, stone, or other material during the action thereon of a medium by which a portion of the material of which they are composed is removed, and my improvements have relation more particularly to that class of such devices in which the material or "work," as it is technically termed, is held by friction induced from the pressure exerted by certain parts of the chuck or carrier upon the work.

In order to more clearly define the scope of my invention I shall, before proceeding to describe the same, classify and refer generally to chucks of the character above referred to as now and heretofore known in the art. These may be divided into "jaw" or "arm" chucks, in which category my invention is comprehended, and chucks of other descriptions, which need not be here considered.

Jaw or arm chucks may be stated to be those in which the work is held by two or more movable jaws or arms, which either press directly against it or against intervening shoes or packing-pieces, and of these chucks there is a class known as "self-tightening." By self-tightening chucks are meant those in which when the arms or jaws are once brought properly in contact with the work to be held, the pressure exerted on the work by the arms or jaws, which tends to prevent the work from altering its position relatively to the chuck, will be increased correspondingly with and proportionately to the pressure exerted by the tool upon the work, which latter pressure tends to cause the work to shift or vary its position relatively to the chuck. The distinction between self-tightening and other jaw or arm chucks is that in the former, after the jaws are once properly in contact with the work, the force which is exerted by the tool on the work tends to cause the chuck to hold more and more tightly, while with chucks which are not self-tightening the jaws are made to press upon the work by a force which is wholly independent of any motion of the work and which does not increase with an increase of pressure of the tool upon the work.

Self-tightening jaw or arm chucks may in turn be divided into "independent" and "universal" chucks, the distinction between the two being that in an independent chuck the motion of each jaw is entirely independent of that of the others, while in a universal chuck the jaws or arms all move together, so that motion of any one jaw is accompanied by similar and corresponding motion of all the other jaws. Among self-tightening arm or jaw chucks lathe-chucks are by far the most numerous, and by this term is meant that class of chucks which hold work which is rotated while being operated on by a tool, or in which the pressure of the tool tends to cause the work being held to rotate. Chucks of such description are frequently used on boring-mills, drill-presses, and other machines in which the work or the tool rotates, as well as on lathes.

The three principal objects to be attained by a chuck which is designed for holding work on a machine-tool—such as a lathe, boring-mill, planer, &c.—while being operated on by a tool, are as follows:

First. The adjustment of the work into such position relatively to the chuck or the machine that a given line in the work (frequently imaginary, as the axis of a cylindrical or annular piece) shall sustain a definite relation to a given line in the chuck or machine, such as the axis about which the chuck or lathe spindle or boring-machine table is intended to rotate. This action of the chuck is commonly called "centering" or "squaring" the work.

Second. The attachment of the work to some part or parts of the chuck so rigidly and firmly that the work and the parts of the chuck to which it is attached virtually become one solid piece. This action of the chuck is commonly called "holding" the work.

Third. The attachment of either the work or the parts of the chuck which hold the work (after the work is centered in and held by the chuck) to the rigid frame of the chuck or to the rigid face-plate or table of the machine in such manner that if the face-plate or table of the machine or the frame of the chuck be rotated the work will be coincidently and correspondingly rotated. The action of the chuck in this regard is called "driving" the work.

The three principal functions of a chuck are, consequently, first, centering or squaring; second, holding, and, third, driving the work. The functions of a carrier are, however, merely twofold—to wit, holding and driving the work. Many, and in fact most, chucks can be employed as carriers; but when so used the work must be centered or squared by some other appliance or device independent of the chuck.

An instance of a self-tightening jaw or arm chuck as heretofore known, which is analogous in principle to that provided by my invention, is exemplified in the patent of W. T. Cole, No. 69,184, dated September 24, 1867, the elements corresponding in function with those which are hereinafter referred to as "pressure members," being termed "pawls" in said patent. As shown therein, said pawls, after they have tightened so as to hold the work, are driven by the pressure of the frame of the chuck against their ends farthest from the work at the parts termed "knuckles," $a\ a$. The entire end-thrust of the work upon the pawls is taken at these points; or, in other words, each pawl has an abutment bearing at the same part at which it is driven. A serious defect of chucks of this type, due to the fact that the pressure members abut at and are driven from the same point, is that the work tends to chatter and vibrate, particularly when subjected to a heavy pressure. A further objection to self-tightening chucks of this general class as heretofore constructed is that the pressure members have not been guided or clamped to the body of the chuck or the frame to which they were attached at points close to the ends of the members which come in contact with the work. As a consequence, the work has had a tendency to vibrate up and down from the body of the chuck, and in some cases the pressure of the arms forces the work away from the body of the chuck. In some cases chucks have been constructed in which the pressure members have been held down to the body of the chuck at the abutment-bearing of the member; but this is too far away from the end of the member which comes in contact with the work to adequately prevent chatter, since in this case the arms themselves vibrate and bend slightly between the point at which they are held down and the end which presses against the work.

I have further found, in experimenting with this class of chucks, that the shoes on the ends of the pressure members were apt to rise slightly from the body of the chuck, independent of the pressure members, so that they also required to be held down to the body of the chuck. The work also, when held in self-tightening chucks of this class and when subjected to the pressure of a tool tending to push it away from the body of the chuck, is sometimes pulled loose from the chuck. Self-tightening arm-chucks have been limited to a comparatively small range in the size of the work which they are suited to hold by the fact that the pressure members could not be extended in length.

The objects of my invention are to provide a chuck embodying the advantageous qualities of self-tightening chucks and carriers heretofore known, and which shall obviate the defects existing therein, as above referred to.

My improved chuck and carrier is designed, first, to hold the work more firmly than it has been held in former self-tightening chucks; second, to prevent chatter of the work when being operated on by a tool; third, to prevent the work from being pulled away from the body of the chuck by the tool when it produces a pressure on the work in this direction, and, fourth, to be adapted to hold widely-differing sizes of work.

To these ends my invention consists in certain novel devices and combinations of mechanism hereinafter fully set forth.

In the accompanying drawings.

In the practice of my invention I provide an arm-retainer for preventing the chatter in one direction of the chuck-arm, a shoe-retainer to prevent the rising of the shoe independently of the arm, and a work-retainer to prevent the work from being pulled away from the chuck. The objectionable chatter of the work in the other direction is prevented by the fact that each of the pressure members of my chuck has an abutment-bearing at one point and is driven at another point, whereas in self-tightening chucks as heretofore constructed each of the pressure members abuts at the point from which it is driven. Work of various sizes is held in my improved chuck by the employment of pressure members which can be shortened or lengthened to conform to the dimensions of the work, as hereinafter explained. The method of driving the arms prevents the excessive vibration and chatter incidental to other self-tightening chucks.

In each of the several views the arms or jaws and other members of the chuck are shown as mounted upon a rigid frame or body, 3, by which they are guided and supported. This frame may be either the plate or table of a lathe or boring-machine or be a separate frame, which can be attached to the machine in which the chuck is to be used. It is not necessarily formed in one piece, and may consist of several properly-connected parts. The piece of material or work, 4, held by the chuck is in each instance, except that shown in Figs. 16 and 17, circular in form, illustrating a railroad-wheel tire, while in said figures it is shown as a straight bar. The arrows on the work 4 indicate the direction in which the pressure of the tool applied to the work while held in the chuck tends to cause the work to move relatively to the chuck.

In order to more clearly explain the general principle on which each arm of the chuck operates when the pressure of the work upon it causes it to tighten itself so as to hold the work securely, I have provided the diagrams Figs. 11, 12, 13, 14, 15. In each of these diagrams the line 33 represents the surface of the work against which the pressure member of the chuck, or, as the case may be, the shoe on the end thereof, presses. The arrows on the lines 33 indicate the direction in which the work tends to move under the pressure of the tool, and consequently the direction in which the end of the pressure member which touches the work tends to move.

Figures 11, 12, 13, 14, 15:
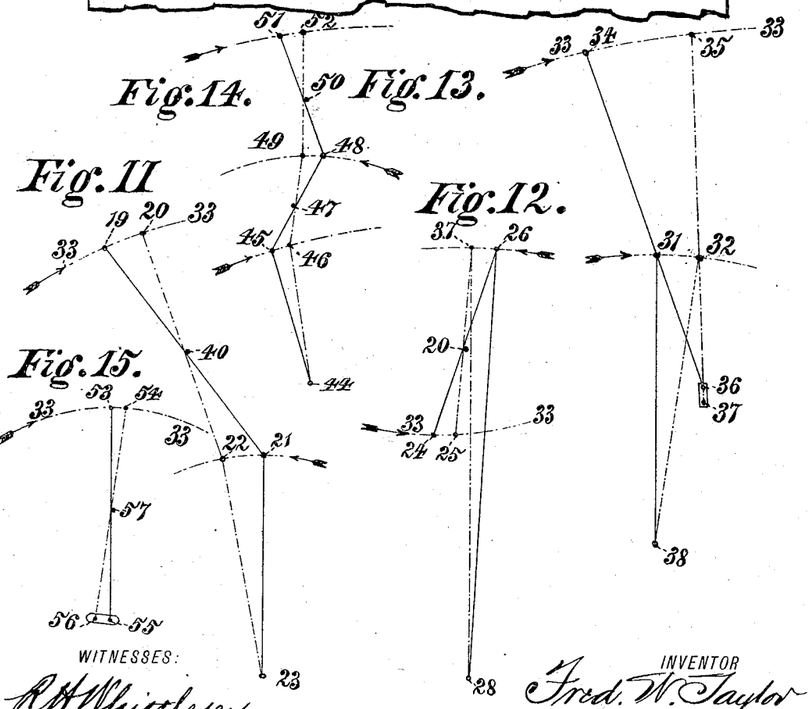
Figs. 11, 12, 13, 14, and 15, outline diagrams illustrating the operative principle of the members of the device.

In the diagram Fig. 15 the line 53 55 indicates the position of the pressure member of a chuck when it has been brought to a proper bearing against the work, but before the tool has been applied to the work, so as to cause it to move through a small distance, and so tighten the pressure member against the work. The end of the pressure member at 53, or a shoe on that end, is in contact with the work. The point 57 is the location of the driving-fulcrum, which drives the pressure member and which is either attached to the frame of the chuck or to the pressure member. Around this driving-fulcrum the pressure member 53 55 swings when it is moved, so as to fasten the work to the chuck.

If the driving-fulcrum 57 be fastened to pressure member 53 55, it (the fulcrum) must continually bear against and be driven by the rigid frame of the chuck, and in that case, when the pressure member 53 55 is moved so as to tighten the chuck to the work, the position of the driving-fulcrum 57 relative to the rigid frame of the chuck is slightly changed; but if the driving-fulcrum 57 be fastened to the rigid frame of the machine at the same time that the pressure member 53 55 swings around the driving-fulcrum 57, it has a slight end motion past 57, so that one end of the pressure member comes rather nearer to the driving-fulcrum 57, while the other end moves slightly farther away from it. The end of the pressure member at 55 abuts against a suitable bearing which receives the end-thrust of the pressure member.

The work 33, which under the pressure of the tool tends to move in the direction indicated by the arrow on the line 33, exerts a force on the end of the pressure member at 53 in the direction of the arrow shown on the line 33. As the pressure member 53 55, under the action of this force, pivots around the driving-fulcrum 57, the end of the member at 53 moves to the position 54, while the abutment end at 55 moves to the position 56. The distance from 56 to 54 being slightly less than from 55 to 53, the pressure member and the work are both put under compression. It is necessary for the successful working of the pressure member that the abutment-bearing should be of such form that as the member moves from position 53 55 to position 54 56 the bearing shall force it more and more tightly against the work, so that ultimately further motion of the work relatively to the pressure member is prevented by the pressure of the member against it.

In the diagram Fig. 11 the line 19 21 represents the pressure member, and 21 23 the abutment member, which, being connected by a suitable joint at 21, together constitute an arm of the chuck in the position which the members occupy when the pressure member has been brought to a proper bearing against the work, but before the tool has been applied to the work, so as to cause it to move through a small distance, and so tighten the pressure member against the work. The end of the pressure member at 19, or a shoe on that end, is in contact with the work.

In the diagram Fig. 12 the line 24 26 represents the pressure member, and 26 28 the abutment member, which, being connected by a suitable joint at 26, together constitute another chuck-arm, differing in form from the arm shown in the diagram Fig. 11, but embodying the same essential elements. The members of this arm are in a position corresponding to that of the members of the arm 19 21 21 23 in the diagram Fig. 11, as above explained. The end of the pressure member at 24, or a shoe on that end, is in contact with the work.

In the diagram Fig. 13 the line 34 36 represents the pressure member, and 31 38 the abutment member, which, being connected by a suitable joint at 31, together constitue another chuck-arm, differing in form from the arms shown in the diagrams Figs. 11 and 12, but embodying the same essential elements as those arms. The members of this arm are in a position corresponding to that of the members of arm 19 21 21 23, as explained above. The end of the pressure member at 34, or a shoe on that end, is in contact with the work.

In the diagram Fig. 14 the line 51 48 represents the pressure member, 48 45 the transmitting member, and 45 44 the abutment member, which, being connected by suitable joints at 45 and 48, together constitute a chuck-arm, differing in form from the arm shown in Figs. 11, 12, and 13, but embodying the same essential elements as those arms. The members of this arm are in a position corresponding to that of the members of arm 19 21 21 23, as explained above.

In Figs. 11, 12, 13, and 14 the driving-fulcrums 40, 20, 36, and 50 perform the same functions for the pressure members 19 21, 24 26, 34 36, and 51 48, respectively that the driving-fulcrum 57 performs for the pressure member 53 55, as explained above.

In the diagram Fig. 11 the abutment member 23 21 oscillates around the main-thrust axis 23, which is a fixed axis in the rigid frame or body of the chuck. I term the axis 23 the "main-thrust axis" because the end pressure, which is transmitted from the pressure member to the abutment member, is resisted by a bearing which is concentric with the main-thrust axis. At the end 21 of the abutment member 23 21 is the abutment-bearing. This bearing receives the end pressure from the pressure member 19 21 and transmits it through the abutment member 21 23 to the main-thrust bearing at 23.

In the diagram Fig. 12 the abutment member 28 26 oscillates around the main-thrust axis 28, which is a fixed axis in the rigid body of the chuck. At the point 26 of the abutment member 28 26 is the abutment-bearing, corresponding to that of the arm shown in Fig. 11, as above explained.

In the diagram Fig. 13 the abutment member 38 31 oscillates around the main-thrust axis 38, which is a fixed axis in the rigid body of the chuck. At the point 31 of the abutment member 38 31 is the abutment-bearing, corresponding to those of the arms explained above.

The *modus operandi* of the arms shown in the diagrams Figs. 11 12, and 13 is as follows: As before stated, the work, which, under the pressure of the tool, tends to move in the direction indicated by the arrows on lines 33, and is in contact with the end of the pressure member 21 19 at 19, 26 24 at 24, and 34 36 at 34, exerts a force on the ends of those arms in the directions indicated by the arrows on the lines 33. As the members 19 21, 24 26, and 34 36, under the action of these forces, tend to pivot around the driving-fulcrums 40, 20, and 36, respectively, the points 21, 26, and 31 of these members, which are attached to the ends of the members 23 21, 28 26, and 38 31 at the points 21, 26, and 31, respectively, tend to move along the lines 21 22, 26 37, and 31 32, respectively, in the directions indicated by the arrows on these lines, while at the same time a force is transmitted through the links 19 21, 24 26, and 34 36, respectively, acting on the points 21 and 26, in the direction indicated by the arrows on lines 21 22 and 26 37, and acting on the point 31 in the opposite direction to that indicated by the arrow on line 31 32. It is evident, therefore, that the joints at 21 and 31 are knee or toggle joints. I shall therefore term chuck-arms working on the general principle of those shown in Figs. 11 and 12 "toggle-joint arms."

The arm shown in Fig. 14 differs from the arms shown in Figs. 11, 12, and 13 in having a transmitting member, 45 48, which transmits the pressure from the pressure member 51 48 to the abutment member 45 44. This transmitting member in its action swings around the fulcrum 47, and is supported by it in the same general way that the pressure member 51 48 swings around and is supported by its fulcrum 50. The abutment-bearing in this arm is at the point 48, being the end of the transmitting member 45 48 which receives the end-thrust of the pressure member 48 51. The main-thrust axis of this arm is at the point 44, around which the abutment member 44 45 swings.

The action of the arm shown in Fig. 14 is the same as that in Fig. 11, except that the transmitting member 45 48 intervenes between the pressure and abutment members, and instead of having one toggle-joint, as in Fig. 11, there are two toggle-joints in Fig. 14, one at 48 and one at 45. I shall therefore term chuck-arms working on the general principle of that shown in Fig. 14 "double toggle-joint arms."

It is evident that chuck-arms could be made having two or more transmitting members intervening between the pressure and abutment members. These arms would work on the same general principle as is indicated in the figures above explained, and would then be called "double," "treble," "quadruple," &c., toggle-joint arms, according to the number of joints in the arm.

If the ends 19 and 34 of the pressure members 21 19 and 36 34 move to the position 20 and 35, respectively, the pressure members 19 21 and 36 34 will assume, respectively, the positions 20 22 and 37 35, and the abutment members 23 21 and 38 31 the positions 23 22 and 38 32. Now, as the points 23 and 38 are fixed centers, and the angles 20 22 23 and 35 32 38 are larger, respectively, than the angles 19 21 23 and 34 31 38, the distance from 20 to 23 would be greater than from 19 to 23, and the distance from 35 to 38 would be greater than from 34 to 38, unless in each instance, by the resistance of the work, the arm had been put in compression, as is the case. Therefore, in reaching the positions 20 22 23 and 35 37, 32 38 the arms would be put under compression and the work as well; but with every toggle-joint which is subjected to a given lateral pressure at the joint the larger the angle between the two members which form the joint the greater is the compression exerted upon the members forming the joint. It is evident then that the greater the pressure exerted by the tool on the work, and tending to move the work in the direction of the arrows on line 33, the greater will be the pressure of the arm against the work to prevent the slipping of the work.

As the end 24 of the pressure member 24 26 in Fig. 12 is moved to the position 25, the pressure member 24 26 and abutment member 26 28 will assume, respectively, the positions 25 37 and 37 28; and since the pressure member 24 26 is hinged to the abutment member 28 26 at 26, as the end 24 approaches the abutment member it must also come nearer to the end of the abutment-arm at 28. Therefore, in reaching the position 25 37, 37 28 the work 33 must have been put under compression, and the pressure member 25 37 as well, while the abutment member 28 37 is put under tension.

I shall term an arm working on the general principle of that shown in Fig. 12 a "hinge-arm."

In Figs. 1, 2, 5, 6, 7, 8, 9, and 10 shoes 17, intervening between the pressure members of the chuck and the work, transmit the pressure of the pressure members to the work, and prevent undue deformation of the work resulting from the pressure of the pressure members.

In Figs. 3, 4, 16, 17, 18, 19, 20, and 21 the ends of the pressure members themselves press against the work. The shoes 17 are loose on the ends of the arms and are free to adjust themselves to a proper bearing against the work.

The parts of the chuck marked 1 in all of the figures are the pressure members of the various chucks to which they belong and have the functions of pressure members, as hereinbefore described.

The parts marked 5 in all of the views of the chuck are the driving-fulcrums. In Figs. 1, 2, 7, 8, 9, and 10 the driving-fulcrum is a pin held up in the under side of the pressure member by a screw-thread cut on one end, while the other end consists of a rectangular head which fits in one of the slots of the body of the chuck 3. In all of the above figures, except Figs. 7 and 8, the driving-fulcrum lies between the two ends of the pressure members; but in Figs. 7 and 8 it is at one end of the same. In Figs. 3, 4, 18, 19, 20, and 21 the driving-fulcrum 5 is a pin fitting in the pressure member and connected by a link, 13, to a pin, 14, which is attached to or part of the chuck-body 3. In Figs. 5, 6, 16, and 17 the driving-fulcrums 5 are either rigidly attached to or part of the chuck-bodies 3.

Figure 16:
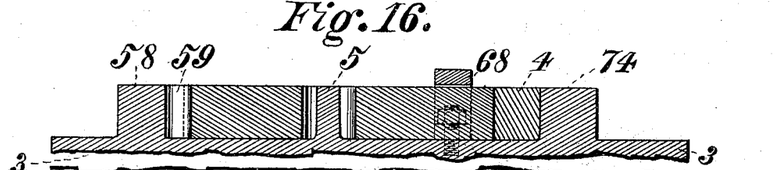
Fig. 16, a similar section at the line $v\ w\ x\ y$ of Fig. 17.
Figure 17:
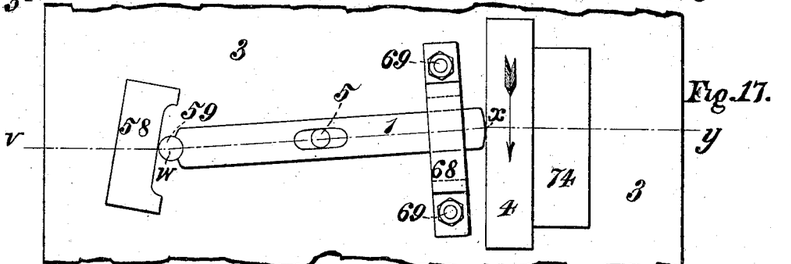

In Figs. 16 and 17 the pressure member 1 is shown to abut against the abutment-bearing 58, which is rigidly attached to or part of the chuck-body 3. The pin or roller 59, intervening between the pressure member and bearing, is intended to diminish the friction in the motion of the pressure member. It is, however, not essential to the successful use of the member, as it might slide directly against the bearing.

The part 74 in Figs. 16 and 17 is a lug or projection, which is part of or attached to the chuck-body 3. The work is supported and squared by this lug, against which it is pressed by the action of the pressure member 1 as it tightens itself. This lug may be of any suitable shape to properly square and support the work.

Figure 1:
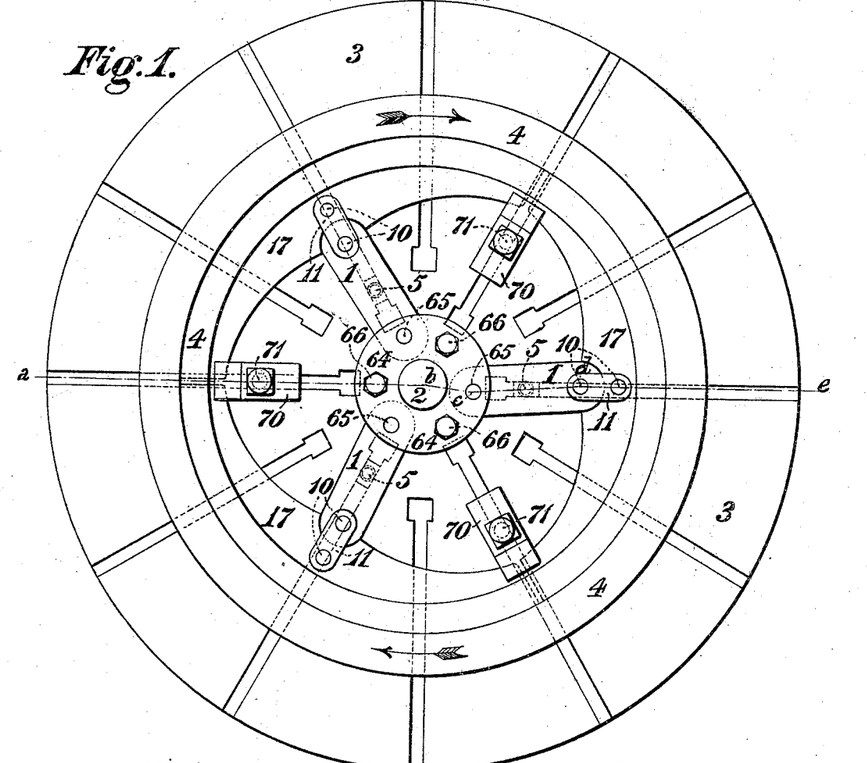
Figures 1, 3, 5, 7, 9, 17, 19, and 21 are plan or top views illustrating, respectively, chucks and carriers, each embodying my invention, and being shown as holding a suitable piece of work.
Figure 2:
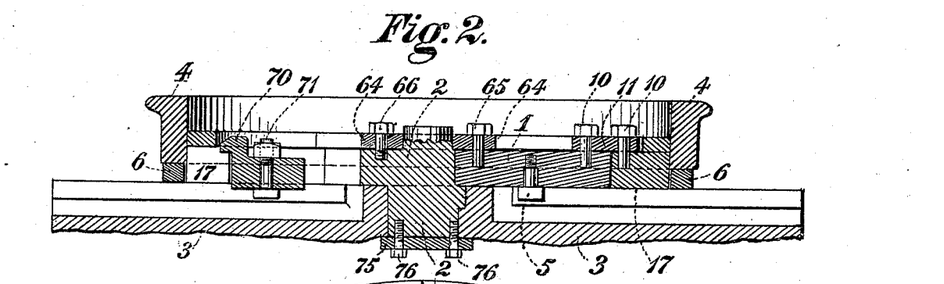
Fig. 2, a vertical transverse section at the line $a\ b\ c\ d\ e$ of Fig. 1.

In Figs. 3, 4, 5, 6, 7, 8, 9, 10, 18, 19, 20, and 21 each of the pressure members has its abutment-bearing at the pin 18, which serves at the same time to connect the pressure member to the abutment member 2. In Figs. 1 and 2 the abutment-bearing is a cylindrical groove cut in the side of the casting 2, into which the cylindrical end of the pressure member fits. Each of the pressure members 1 in this chuck is secured to the abutment member 2 and held down by the plate 64 and pin 65. The plate 64 is bolted to the top of abutment member 2 by bolts 66. Although the pressure members are held down, as just described, this is not sufficient to prevent the chatter of the members, so that I use in this chuck shoe-retainers 70, and in some cases, also, arm-retainers are necessary. The casting 2 is held down to the chuck-body 3 in this view by a plate, 75, which is bolted to the under side of it by bolts 76.

Figure 7:
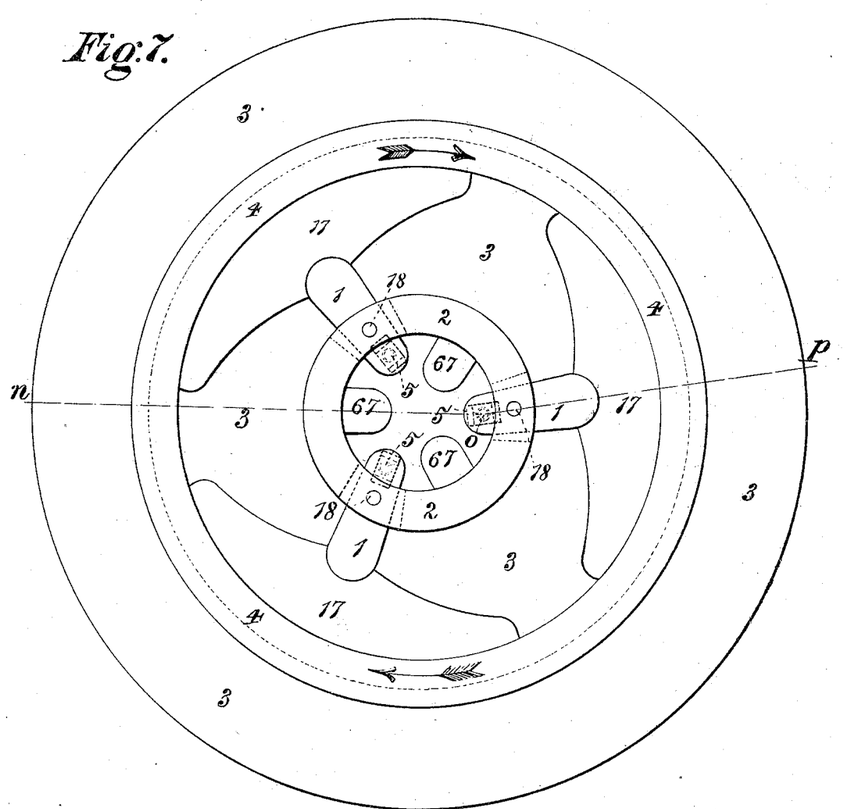
Figure 8:
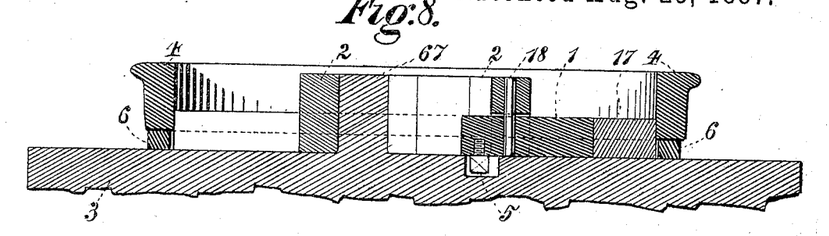
Fig. 8, a similar section at the line $n\ o\ p$ of Fig. 7.

The abutment-bearing of the pressure member 1 in Figs. 7 and 8 lies between the two ends of each member. In each of the other views the abutment-bearing is at the end of the pressure member.

Figure 9:
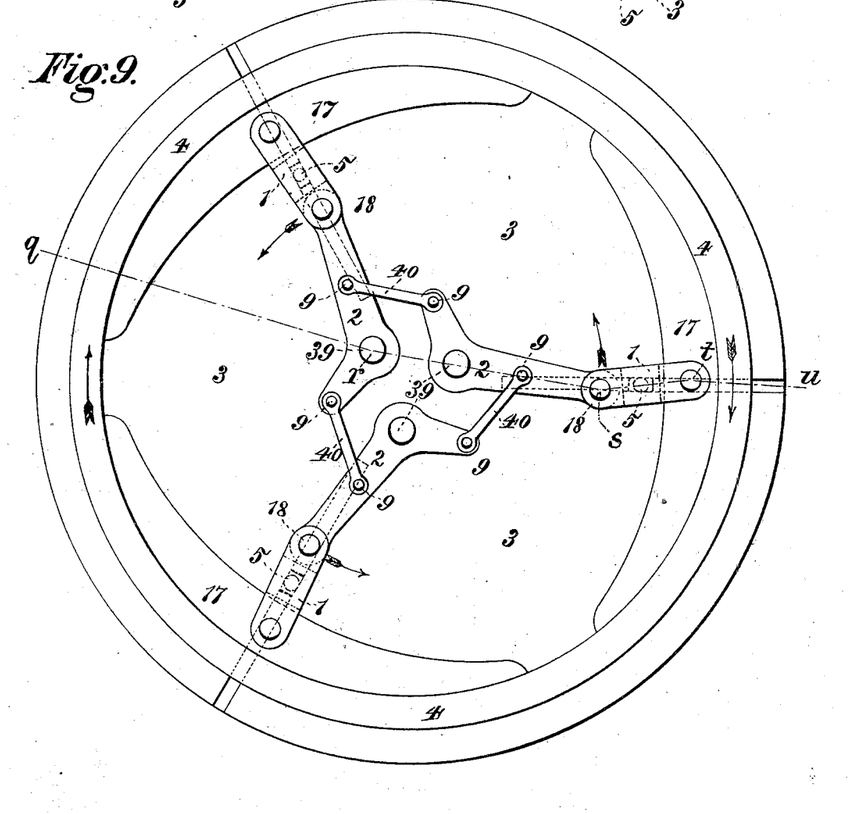
Figure 10:
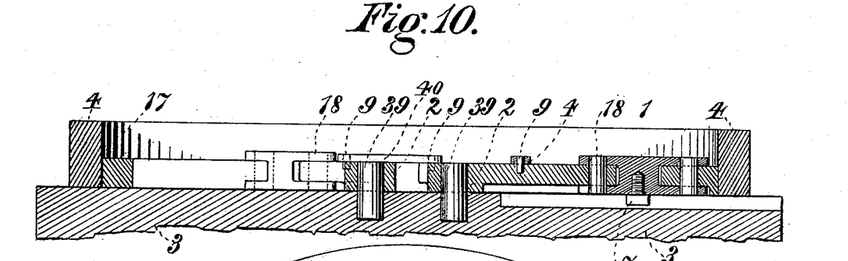
Fig. 10, a similar section at the line $q\ r\ s\ t\ u$ of Fig. 9.

The parts 2 in the several Figs. 1, 2, 3, 4, 5, 6, 7, 8, 9, 10, 18, 19, 20, and 21 are the abutment members of the chucks to which they belong. In Figs. 9, 10, 20, and 21 each of the abutment members oscillates around and is supported by a separate pin, 39, which I term the "main-thrust bearing," and the axis at the center of this pin the "main-thrust axis." These main-thrust bearings 39 are either part of or attached to the chuck-body. Each of the abutment members 2 in Figs. 9 and 10 is attached to the other two abutment members by links 40 and pins 9, so that a motion of any one of the abutment members around its main-thrust axis will produce a similar motion in each of the other two members. By this means all abutment members, and therefore, also, the pressure members of the chuck, are made to have similar motions.

Figure 20:
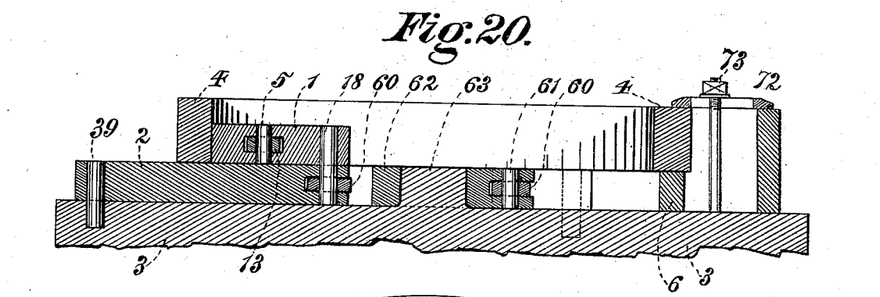
Fig. 20, a similar section at the line $z'\ z^2\ z^3\ z^4\ z^5$ of Fig. 21.
Figure 21:
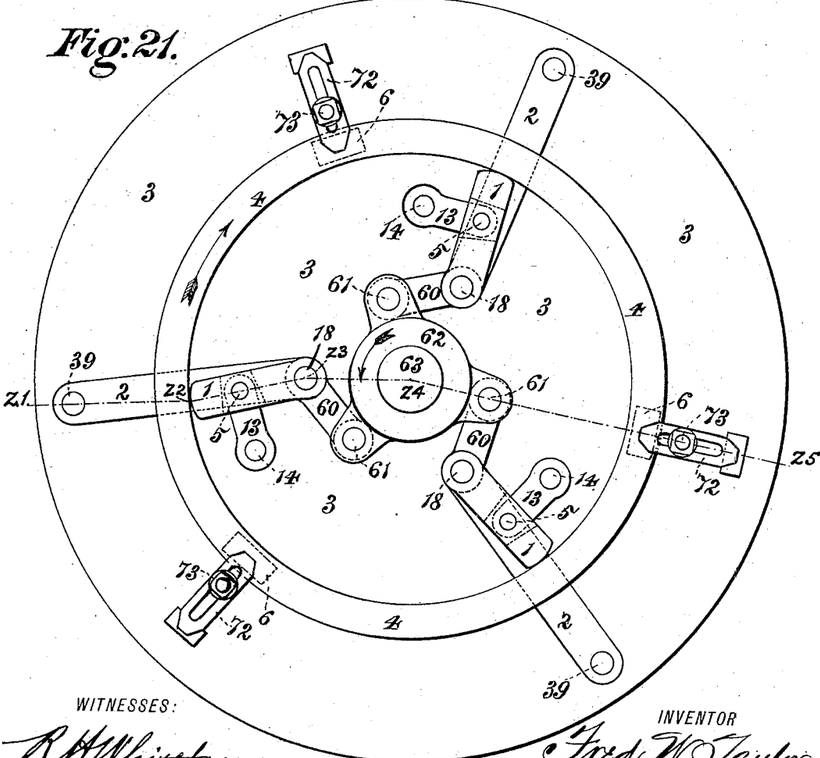

In Figs. 20 and 21 the pin 18 of each arm, which forms the abutment-bearing, is connected by a link, 60, and pin 61 to a ring, 62, which has three lugs upon it to receive pins 61, and which is bored to fit around a pin, 63, which is either part of or attached to the center of the chuck-body 3. By means of these links and pins and ring 62 all of the three chuck-arms are made to have similar motions.

In each of the Figs. 1, 2, 3, 4, 5, 6, 7, 8, 18, and 19, instead of having a separate abutment member for each of the pressure members of the chuck, (as is the case with the chucks shown in Figs. 9, 10, 20, and 21, and explained above,) all of the pressure members have one common abutment member 2, which is guided so as to oscillate around a fixed axis in the center of the chuck. In these chucks the main pressure axis of all of the arms is at the same place, (in the center of the chuck,) while in Figs. 9, 10, 20, and 21 each arm has its own main pressure axis separate from all the others.

In Figs. 1 and 2 the cylindrical portion of the abutment member 2 fits in a cylindrical hole bored in the center of the chuck-body 3, and in Figs. 3, 4, 18, and 19 a cylindrical hole is bored in the center of the abutment member 2, which fits around the cylindrical pin in the center of the chuck-body 3.

Figure 5:
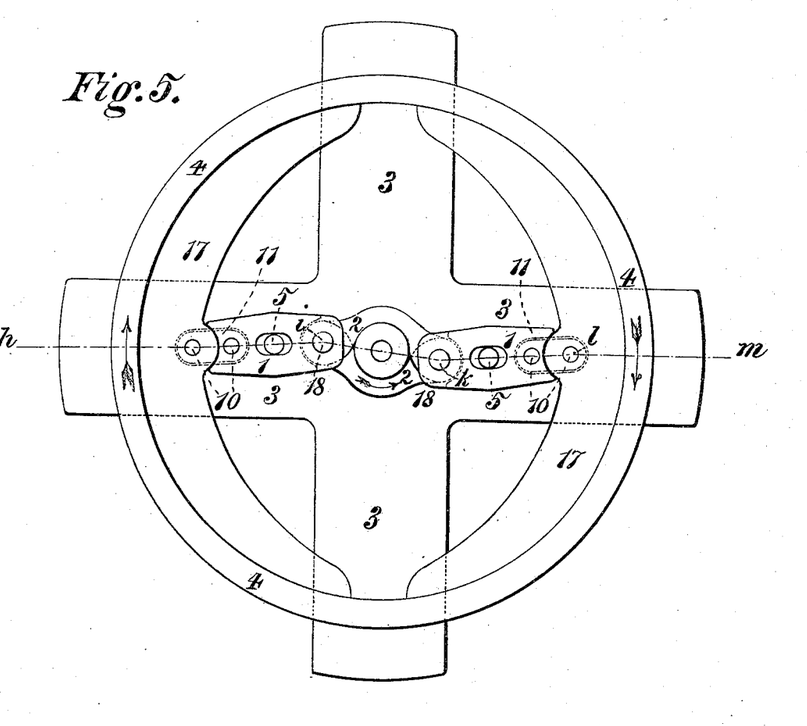
Figure 6:
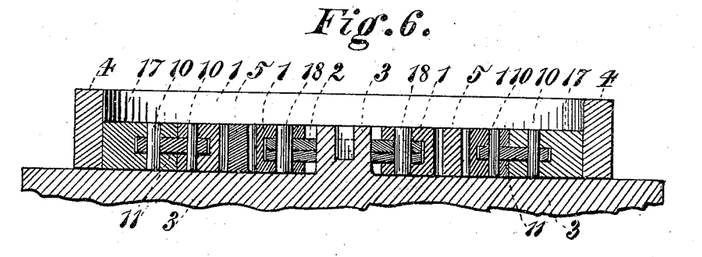
Fig. 6, a similar section at the line $h\ i\ k\ l\ m$ of Fig. 5.

The abutment member of each of the pressure members in Figs. 5 and 6 is composed of two forgings or castings, 2, connected to one another and to the pressure members by pins 18. These two forgings are bored so as to fit around the turned pin in the middle of the chuck-body.

The abutment member 2 in Figs. 7 and 8 consists of a ring of metal bored to fit around the outside of the three bosses 67, which are attached to or part of the chuck-body 3. These bosses have their outer surfaces turned so as to be concentric with the chuck-body. Each of the pressure members passes through a gap cut in the under side of the abutment member or ring 2. The abutment-bearing 18 in these pressure members is between the driving-fulcrum 5 and the end of the member which presses against the shoe.

In Figs. 16 and 17 an arm-retainer, 68, is fixed near the end of the pressure member which comes in contact with the work. The arm-retainer shown in these views is a clamp fitting neatly over the top of the arm and bolted by bolts 69 to the chuck-body. This can be fitted in either of two ways: First, it may be fitted so that when it is bolted down to the chuck-body the top of the pressure member just touches the under side of the arm-retainer—that is, the pressure member is free to slide under the arm-retainer, but cannot chatter up and down; or, second, so that the arm-retainer when bolted down on top of the pressure member squeezes it tightly against the chuck-body, and so tends to prevent even the minutest chatter in all directions of the pressure member. The second method of fitting the arm-retainer I deem preferable to the first, and when it is employed the arm-retainer should not be tightened onto the pressure member until after the pressure member has tightened itself as firmly against the work as is necessary to hold the work.

In Figs. 1 and 2 a shoe-retainer, 70, is shown at the end of each of the shoes, the same being held down to the chuck-body by a bolt, 71. In these views one shoe-retainer serves to hold down the end of two shoes. The shoe-retainers may be fitted and used in either of the two ways that I have described above for fitting the arm-retainer; but I prefer the second method of fitting and using. I have in the accompanying figures shown only one form of arm-retainer and one form of shoe-retainer. It is, however, manifest that without departing from the spirit of my invention a great variety of shoe or arm retainers might be made. For example, a bolt with washer on top might be fitted through a slot near the end of the pressure member for an arm-retainer, or through a slot in the shoe for a shoe-retainer; or the pressure member or shoe-retainer might have a suitable projection cast upon or attached to it fitting under a suitable projection in the chuck-body.

In Figs. 20 and 21 are shown three work-retainers, each of which consists of a clamp, 72, and a bolt, 73, fitting in a suitable slot in the chuck-body and pulling the clamp down on top of the work. I have shown an arm-retainer, shoe-retainer, and work-retainer each applied to one chuck only, as they would simply complicate the drawings of the other chucks by having them shown there.

Figure 3:
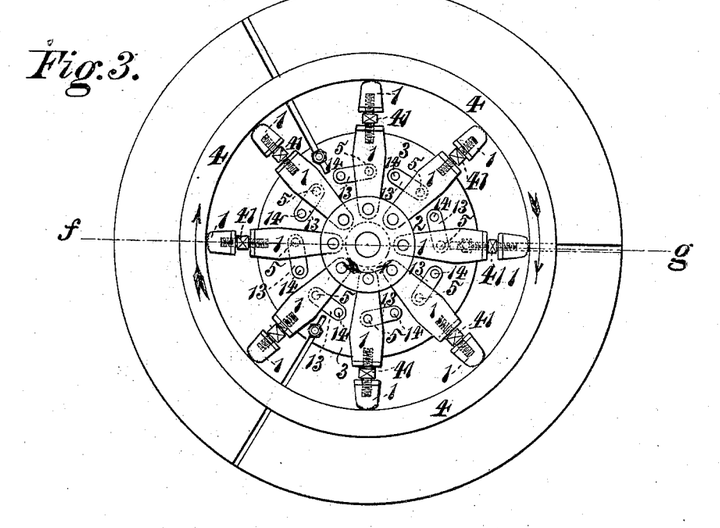
Figure 4:
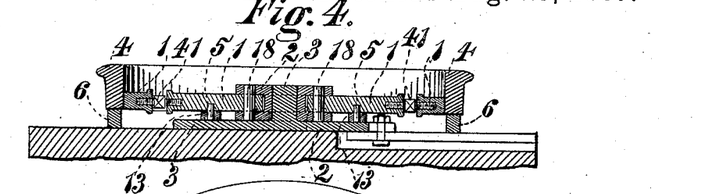
Fig. 4, a similar section at the line $f\ g$ of Fig. 3.

The pressure member 1 of each of the arms of the chuck shown in Figs. 3 and 4 consists of two parts joined together by a screw, 41, one end of which has a right-hand thread cut on it fitting into one of the parts of the member, and the other end has a left-hand thread fitting into the other part of the member 1. By means of these screws each of the members 1 can be either lengthened or shortened, so that the chuck can be made to hold work of varying diameters. A pressure member constructed so that it can be lengthened or shortened I shall term an "adjustable pressure member."

Figure 18:
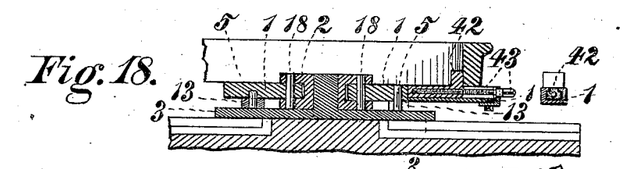
Fig. 18, a similar section at the line $z\ z$ of Fig. 19.
Figure 19:
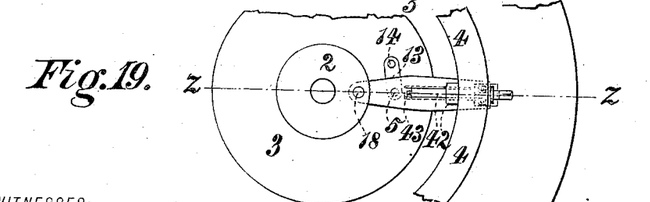

Instead of each of the adjustable pressure members 1 of the chuck shown in Figs. 3 and 4 the adjustable pressure member 1, shown in Figs. 18 and 19 could be substituted, the difference between the pressure member and each of those shown in Figs. 3 and 4 being that in Figs. 3 and 4 each pressure member is lengthened and shortened by turning the right and left hand screws 41, while in Figs. 18 and 19 the pressure member is lengthened and shortened by moving the dog 42 toward or away from the end of the pressure member 1 by means of the screw 43. This dog is planed to fit in a groove in the pressure member 1, by which it is guided, as it is moved backward and forward, by the screw 43, which fits in a threaded hole in the dog, just as the arms of the independent jaw-chucks in common use are moved backward and forward by the leading-screws which fit in them.

In Figs. 1, 2, 3, 4, 5, 6, 9, and 10 each of the pressure members 1, with its abutment member 2, together constitute a toggle-joint arm which operates on the same principle as the skeleton toggle-joint arm shown in Fig. 11 and hereinbefore explained.

All of the chucks shown in the above views are universal chucks—that is, all of the arms of each chuck operate together and have similar motions.

The length of each of the pressure members in Figs. 3, 4, 18, and 19 can be varied independently, so that I shall term chucks of this nature "adjustable-arm chucks." By removing one or more of the links 40 from the chuck shown in Figs. 9 and 10 that chuck can be made an independent chuck.

In Figs. 7 and 8 each of the pressure members 1, with its abutment member 2, together constitute a toggle-joint arm which operates on the same general principle as the skeleton toggle-joint arm shown in Fig. 13 and hereinbefore explained.

In Figs. 20 and 21 each of the pressure members 1, with its abutment member 2, together constitute a hinge-arm which operates on the same general principle as the skeleton hinge-arm shown in Fig. 12, and hereinbefore explained.

In all of the views the arrows on the work 4 indicate the direction in which the work tends to move under the pressure of the tool. The chucks or (if used as carriers) the carriers rotate or move in the opposite direction to that indicated by the arrows on the work.

In Figs. 2, 4, 8, 20, and 21 the parts marked 6 are parallel pieces intervening between the work and the chuck-body. In Figs. 1, 2, 5, and 7 the links 11, together with the pins 10, connect the pressure members with the shoes on the ends of them. They are used for drawing the shoes away from the work after the work has been operated on by the tool.

As before explained, the function of each of the driving-fulcrums 5 is not only to furnish a fulcrum around which each of the parts 1 of the arms pivot as the arms tighten themselves, but also to drive the arms and the work when it is being operated upon.

In experimenting with chucks having toggle-joint arms similar to those shown in the drawings, I have found that they will not hold work satisfactorily, and cease to be self-tightening unless the angle at the toggle-joint made by the two members of each arm is within a few degrees of one hundred and eighty degrees after the work is centered. It is also necessary that each of the fulcrums 5, about which the members of the arms 1 pivot, be situated at a considerable distance from the end of the arm which comes in contact with the work, in order that the tendency of the work to rotate under the pressure of the tool may exert a sufficient force on the arms to overcome the friction between the various parts of the chuck, and cause it to tighten itself against the work with sufficient pressure to hold it; otherwise the chuck would not be self-tightening. The same principle applies to chucks having hinge-arms—that is, the angle made by the pressure member with the abutment member must be a few degrees from zero in order to have the arms work properly.

It will be obvious without representation by a drawing that a chuck can be made in which either a single toggle-joint arm or hinge-joint arm can be used for holding the work in a manner similar to that in which it is held by the pressure member shown in Figs. 16 and 17, and such a chuck would be within the scope of my invention. Further, a lathe carrier or driver may be constructed similarly to any of the chucks shown in the drawings. The main body or frame 3 need not then be rigidly attached to the revolving face-plate, table, or spindle of the machine in which the carrier is intended to be used, but can be driven by suitable driving attachment. It would be necessary in such case that the work should be centered by a separate centering mechanism.

I am aware that self-tightening chucks have been heretofore known in which each of the arms or jaws consists of a single pressure member which pivots around a rigid pivot or axis; but in such chucks the abutment-bearing was located at the same part of the member from which the work was driven. I am also aware that arms each of which consists of a toggle-joint have been used in chucks which are not self-tightening. I therefore disclaim, broadly, chucks of the constructions above specified.

I have not illustrated a chuck having double or treble toggle-joint arms, as the method of construction of such a chuck will be evident from the accompanying drawings and the description hereinbefore given. The word "chuck" as employed in the claims is applied generically to comprehend both a chuck and a carrier.

It will be clear that, although no shoes are shown in Figs. 3, 4, 16, 17, 18, 19, 20, and 21 as intervening between the ends of the pressure members and the work, shoes could be used on such chucks, and in many cases it would be necessary, to prevent undue deflection in the work from the pressure of the pressure members, to use such shoes. It will be also obvious that, although adjustable pressure members are shown only in Figs. 3, 4, 18, and 19, they might be used in each of the forms of chucks shown in the drawings.

I claim as my invention and desire to secure by Letters Patent—

1. In a self-tightening chuck, the combination of a chuck-body, one or more pressure members, and one or more arm-retainers, substantially as set forth.

2. In a self-tightening arm-chuck, the combination of a chuck-body, one or more pressure members, one or more shoes intervening between the pressure members and the work, and one or more shoe-retainers, substantially as set forth.

3. In a self-tightening chuck, the combination of a chuck-body, one or more pressure members, and one or more work-retainers, substantially as set forth.

4. In a self-tightening chuck-arm, the combination of a pressure member, a driving-fulcrum which drives the pressure member, and an abutment-bearing at a different part of the pressure member from the driving-fulcrum, substantially as set forth.

5. In a self-tightening chuck-arm, the combination of a pressure member, a driving-fulcrum which drives the pressure member, an abutment-bearing at a different part of the pressure member from the driving-fulcrum, and an abutment member, substantially as set forth.

6. In a self-tightening chuck-arm, the combination of a pressure member, a driving-fulcrum which drives the pressure member, an abutment-bearing located at a different part of the pressure member from the driving-fulcrum, an abutment member, and one or more transmitting members intervening between the pressure and abutment members, substantially as set forth.

7. In a self-tightening chuck-arm, the combination of a pressure member, a driving-fulcrum which drives the pressure member, an abutment-bearing located at a different part of the pressure member from the driving-fulcrum, and a suitable shoe intervening between the pressure member and the work, substantially as set forth.

8. In a self-tightening chuck-arm, the combination of a pressure member, a driving-fulcrum which drives the pressure member, an abutment-bearing located at a different part of the pressure member from the driving-fulcrum, a suitable shoe intervening between the pressure member and the work, and one or more shoe-retainers, substantially as set forth.

9. In a universal self-tightening arm-chuck, the combination of two or more pressure members, each of which is driven by a driving-fulcrum located at a different part of the member from the abutment-bearing, substantially as set forth.

10. In a universal self-tightening arm-chuck, the combination of two or more pressure members, each of which is driven by a driving-fulcrum located at a different part of the member from the abutment-bearing, and one or more arm-retainers, substantially as set forth.

11. In a universal self-tightening arm-chuck, the combination of two or more pressure members, each of which is driven by a driving-fulcrum located at a different part of the member from the abutment-bearing, with two or more shoes intervening between the pressure members and work, and one or more shoe-retainers, substantially as set forth.

12. In a universal self-tightening arm-chuck, the combination of two or more pressure members, each of which is driven by a driving-fulcrum located at a different part of the member from the abutment-bearing, and one or more work-retainers, substantially as set forth.

13. In a universal self-tightening arm-chuck, the combination of two or more pressure members, each of which is driven by a driving-fulcrum located at a different part of the member from the abutment-bearing, and an abutment member for each pressure member, substantially as set forth.

14. In a universal self-tightening arm-chuck, the combination of two or more pressure members, each of which is driven by a driving-fulcrum at a different part of the member from the abutment-bearing, an abutment member for each pressure member, and one or more arm-retainers, substantially as set forth.

15. In a universal self-tightening arm-chuck, the combination of two or more pressure members, each of which is driven by a driving-fulcrum at a different part of the member from the abutment-bearing, an abutment member for each pressure member, two or more shoes intervening between the pressure members and work, and one or more shoe-retainers, substantially as set forth.

16. In a universal self-tightening arm-chuck, the combination of two or more pressure members, each of which is driven by a driving-fulcrum at a different part of the member from the abutment-bearing, an abutment member for each pressure member, and one or more work-retainers, substantially as set forth.

17. In a self-tightening arm-chuck, the combination of a chuck-body and one or more toggle-joint arms, substantially as set forth.

18. In a self-tightening arm-chuck, the combination of a chuck-body, one or more toggle-joint arms, and one or more arm-retainers, substantially as set forth.

19. In a self-tightening arm-chuck, the combination of a chuck-body, one or more toggle-joint arms, one or more shoes intervening between the ends of the arms and the work, and one or more shoe-retainers, substantially as set forth.

20. In a self-tightening arm-chuck, the combination of a chuck-body and one or more hinge-arms, substantially as set forth.

21. In a self-tightening arm-chuck, the combination of a chuck-body, one or more hinge-arms, and one or more arm-retainers, substantially as set forth.

22. In a self-tightening arm-chuck, the combination of a chuck-body, one or more hinge-arms, one or more shoes intervening between the ends of the arms and the work, and one or more shoe-retainers, substantially as set forth.

23. In a universal self-tightening arm-chuck, the combination of a chuck-body and two or more toggle-joint arms, substantially as set forth.

24. In a universal self-tightening arm-chuck, the combination of a chuck-body and two or more hinge-arms, substantially as set forth.

FREDERICK W. TAYLOR.

Witnesses:
LOUIS S. WRIGHT,
WM. H. COLBY.